(12) United States Patent
Xin et al.

(10) Patent No.: US 11,277,324 B2
(45) Date of Patent: Mar. 15, 2022

(54) DETERMINING AN EXECUTION POLICY OF A SERVICE

(71) Applicant: HUAWEI TECHNOLOGIES CO., LTD., Guangdong (CN)

(72) Inventors: Yang Xin, Shanghai (CN); Xiaobo Wu, Shanghai (CN); Weiwei Chong, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/832,910

(22) Filed: Mar. 27, 2020

(65) Prior Publication Data

US 2020/0228429 A1  Jul. 16, 2020

Related U.S. Application Data

(63) Continuation of application No. PCT/CN2018/104188, filed on Sep. 5, 2018.

(30) Foreign Application Priority Data

Sep. 30, 2017 (CN) .......................... 201710915363.1

(51) Int. Cl.
*H04L 12/26* (2006.01)
*H04L 29/08* (2006.01)
(Continued)

(52) U.S. Cl.
CPC ........ *H04L 43/0817* (2013.01); *H04L 43/087* (2013.01); *H04L 43/0829* (2013.01); *H04L 43/0894* (2013.01); *H04L 67/14* (2013.01)

(58) Field of Classification Search
CPC ............. H04L 43/0817; H04L 43/0829; H04L 43/087; H04L 43/0894; H04L 67/14
(Continued)

(56) References Cited

U.S. PATENT DOCUMENTS 7,860,124 B2 * 12/2010 Wang ...................... H04L 47/70
370/468
9,690,605 B2 * 6/2017 Van Kerkwyk ....... H04L 41/042
(Continued)

FOREIGN PATENT DOCUMENTS

| CN | 101060466 A | 10/2007 |
|---|---|---|
| CN | 102665191 A | 9/2012 |

(Continued)

OTHER PUBLICATIONS

Open Network Automation Platform (ONAP), 3GPP status presentation, 1-22 (last modified Sep. 28, 2017) (Year: 2017).*
(Continued)

*Primary Examiner* — David P Zarka
(74) *Attorney, Agent, or Firm* — Fish & Richardson P.C.

(57) ABSTRACT

Embodiments of this application relate to a policy determining method and a communications apparatus. The method includes: obtaining, by a policy control network element, policy information from a data analytics network element; and determining, by the policy control network element, an execution policy of a service based on the policy information. In the policy determining method in the embodiments of this application, dynamic adjustment and refined management on the execution policy can be implemented.

14 Claims, 7 Drawing Sheets

(51) Int. Cl.
*H04L 43/0817* (2022.01)
*H04L 43/0829* (2022.01)
*H04L 43/087* (2022.01)
*H04L 43/0894* (2022.01)
*H04L 67/14* (2022.01)

(58) Field of Classification Search
USPC .......................................................... 709/224
See application file for complete search history.

(56) References Cited

U.S. PATENT DOCUMENTS

| | | | |
|---|---|---|---|
| 9,894,709 B2* | 2/2018 | Lee | H04W 8/20 |
| 10,362,507 B2* | 7/2019 | Dao | H04W 28/0268 |
| 10,912,016 B2* | 2/2021 | Cui | H04L 41/5025 |
| 2016/0094568 A1 | 3/2016 | Balasubramanian et al. | |
| 2017/0104609 A1 | 4/2017 | Mcnamee et al. | |
| 2018/0262924 A1* | 9/2018 | Dao | H04W 72/1257 |
| 2020/0252813 A1* | 8/2020 | Li | H04W 24/08 |
| 2021/0168705 A1* | 6/2021 | Fiorese | H04W 12/06 |
| 2021/0219238 A1* | 7/2021 | Sharma | G16Y 20/30 |

FOREIGN PATENT DOCUMENTS

| | | |
|---|---|---|
| CN | 104302004 A | 1/2015 |
| CN | 105471611 A | 4/2016 |
| EP | 3174335 A1 | 5/2017 |

OTHER PUBLICATIONS

SA WG2 Meeting #120, NWDA Procedures, S2-171695, pp. 1-3 (Mar. 2017) (Year: 2017).*
SA WG2 Meeting #120, NWDA Procedures, S2-172472, pp. 1-3 (Mar. 2017) (Year: 2017).*
SA WG2 Meeting #120, NWDA Services, S2-172499, pp. 1-4 (Mar. 2017) (Year: 2017).*
SA WG2 Meeting #122bis, Proposal for removal of editor's note in A.2.2.6 and parameters notified by NWDAF, S2-175539, pp. 1-2 (Aug. 2017) (Year: 2017).*
SA WG2 Meeting #122, TS23.501: Clarifications on NWDA Service Based Interface, S2-174332, pp. 1-3 (Jun. 2017) (Year: 2017).*
Text from U.S. Appl. No. 62/544,399, filed Aug. 11, 2017 (Year: 2017).*
Huawei, "TS23.501: Clarifications on NWDA Service Based Interface",3GPP Draft, 3GPP SA WG Meeting #122, S2-174332,XP051303185, San Jose Del Cabo, Mexico, Jun. 25, 2017, 4 pages.
3GPP TR 29.890 V0.2.0 (May 2017),3rd Generation Partnership Project,Technical Specification Group Core Network and Terminals,Study on CT WG3 Aspects of 5G System Phase 1, Stage 3(Release 15), 42 pages.
China Telecom et al.,"Study on encrypted traffic detection and verification",SA WG2 Meeting #121 S2-174000, Hangzhou, China, May 15-19, 2017, 3 pages.
Huawei, "Discussion about Big Data Driven Network Architecture",3GPP Draft,3GPP TSG SA WG2, S2-173192, P051281694, Hangzhou, China, May 14, 2017,12 pages.
AT&T et al., "Network Data Analytics",3GPP Draft, SA WG2 Meeting #S2-119, S2-171604, XP051240823, Dubrovnik, Croatia, Feb. 18, 2017, 6 pages.
Huawei Hisilicon, "TS 23.501: Procedures between PCF and AMP",3GPP Draft, SA WG2 Meeting #120, S2-172509, XP051258072, Busan, South Korea, Apr. 3, 2017, 6 pages.
Extended European Search Report issued in European Application No. 18863106.3 dated May 25, 2020, 11 pages.
PCT International Search Report and Written Opinion in International Application No. PCT/CN2018/104,188, dated Nov. 21, 2018, 15 pages (With English Translation).
Office Action issued in Chinese Application No. 201710915363.1 dated Apr. 2, 2021, 17 pages (with English translation).
Orange et al., "Alignment of Policy framework to SBA," SA WG2 Meeting #122, S2-175312, San Jose Del Cabo, Mexico, Jun. 26-30, 2017, 9 pages.

* cited by examiner

DETERMINING AN EXECUTION POLICY OF A SERVICE

CROSS-REFERENCE TO RELATED APPLICATION

This application is a continuation of International Application No. PCT/CN2018/104188, filed on Sep. 5, 2018, which claims priority to Chinese Patent Application No. 201710915363.1, filed on Sep. 30, 2017. The disclosure of the aforementioned applications are hereby incorporated by reference in their entireties.

TECHNICAL FIELD

This application relates to the field of communications technologies, and in particular, to a policy determining method and a communications apparatus.

BACKGROUND

In a 5th generation (5G) communications network, a network data analytics function (NWDAF) network element is led. The NWDAF network element uses a big data analytics method to perform model training, and uses a trained model to analyze data. However, in the prior art, how to perform policy determining by using the NWDAF network element in the communications network is not provided.

SUMMARY

In this application, a policy determining method and a communications apparatus that can implement policy determining by using a data analytics network element in a communications network are provided.

According to a first aspect of this application, a policy determining method is provided and includes: obtaining, by a policy control network element, policy information from a data analytics network element; and determining, by the policy control network element, an execution policy of a service based on the policy information. In embodiments of this application, dynamic adjustment and refined management on the execution policy can be implemented.

In a possible implementation, the method further includes: receiving, by the policy control network element, a service type that is of a to-be-sent service and that is sent from a session management network element; and the determining, by the policy control network element, an execution policy of a service based on the policy information includes: determining, by the policy control network element, an execution policy of a service of the service type based on the policy information.

In a possible implementation, the obtaining, by a policy control network element, policy information from a data analytics network element includes: sending, by the policy control network element, the service type to the data analytics network element; and receiving, by the policy control network element, policy information, corresponding to the service type, sent from the data analytics network element.

In a possible implementation, the method further includes: obtaining, by the policy control network element, at least one of a network parameter of a network in which the service of the service type is located and information that is about a terminal device and that corresponds to the service.

In a possible implementation, the determining, by the policy control network element, an execution policy of a service of the service type based on the policy information includes: determining, by the policy control network element based on the at least one of the network parameter and the information about the terminal device, policy information corresponding to the service of the service type in the policy information; and determining, by the policy control network element, the execution policy of the service of the service type based on the policy information corresponding to the service of the service type.

In a possible implementation, the policy control network element sends the execution policy to the session management network element.

In a possible implementation, the method further includes: receiving, by the policy control network element, updated policy information sent from the data analytics network element; and determining, by the policy control network element based on the updated policy information, an updated execution policy of the service.

According to a second aspect of this application, a policy determining method is provided and includes: obtaining, by a data analytics network element, policy information; and sending, by the data analytics network element, the policy information to a policy control network element.

In a possible implementation, before the sending, by the data analytics network element, the policy information, the method further includes: receiving, by the data analytics network element, a service type that is of a to-be-sent service and that is sent from the policy control network element; and the obtaining, by a data analytics network element, policy information includes: obtaining, by the data analytics network element, policy information corresponding to the service type.

In a possible implementation, the method further includes: obtaining, by the data analytics network element, a network parameter of a network in which the service of the service type is located.

In a possible implementation, the obtaining, by the data analytics network element, a network parameter of a network in which the service of the service type is located includes: receiving, by the data analytics network element, the network parameter that is of the network in which the service of the service type is located and that is sent from a policy analytics network element; or receiving, by the data analytics network element, information that is about a terminal device and that corresponds to the service sent from a policy analytics network element, and obtaining, by the data analytics network element based on the information about the terminal device, the network parameter of the network in which the service of the service type is located.

In a possible implementation, the obtaining, by the data analytics network element, policy information corresponding to the service type includes: determining, by the data analytics network element from the policy information based on the network parameter of the network in which the service of the service type is located, policy information corresponding to the service of the service type.

In a possible implementation, after the sending, by the data analytics network element, the policy information, the method further includes: obtaining, by the data analytics network element, an updated network parameter of the network in which the service of the service type is located; determining, by the data analytics network element based on the updated network parameter, updated policy information; and sending, by the data analytics network element, the updated policy information to the policy control network element.

In a possible implementation, before the obtaining, by a data analytics network element, policy information, the method further includes: obtaining, by the data analytics network element, training data; and the obtaining, by a data analytics network element, policy information includes: obtaining, by the data analytics network element, policy information of at least one service type based on the training data.

According to a third aspect of this application, a session management method is provided and includes: establishing, by a session management network element, a default flow, where the default flow is used to transmit a service; and establishing, by the session management network element, a dedicated flow for the service based on a service type of the service.

In a possible implementation, the establishing, by the session management network element, a dedicated flow for the service based on the service type includes: sending, by the session management network element, the service type of the service to a policy control network element; and receiving, by the session management network element, an execution policy corresponding to the service type sent from the policy control network element.

In a possible implementation, the session management network element sends at least one of a network parameter of a network in which the service of the service type is located and information that is about a terminal device and that corresponds to the service to the policy control network element.

In a possible implementation, the method further includes: receiving, by the session management network element, the service type that is of the service and that is sent from a user plane network element.

According to a fourth aspect of this application, a communications apparatus is provided. The communications apparatus may be a policy control network element. The communications apparatus includes: a transceiver unit, configured to obtain policy information from a data analytics network element; and a processing unit, configured to determine an execution policy of a service based on the policy information.

According to a fifth aspect of this application, a communications apparatus is provided. The communications apparatus may be a data analytics network element. The communications apparatus includes: a processing unit, configured to obtain policy information; and a transceiver unit, configured to send the policy information to a policy control network element.

According to a sixth aspect of this application, a communications apparatus is provided. The communications apparatus may be a session management network element. The communications apparatus includes: a processing unit and a transceiver unit, where the processing unit receives and transmits content by using the transceiver unit; the processing unit is configured to establish a default flow, where the default flow is used to transmit a service; and the processing unit is further configured to establish a dedicated flow for the service based on a service type of the service.

In a possible implementation, the transceiver unit is configured to send the service type of the service to a policy control network element; and the transceiver unit receives an execution policy corresponding to the service type sent from the policy control network element.

In a possible implementation, the transceiver unit is further configured to send at least one of a network parameter of a network in which the service of the service type is located and information that is about a terminal device and that corresponds to the service to the policy control network element.

In a possible implementation, the transceiver unit is further configured to receive the service type that is of the service and that is sent from a user plane network element.

In any one of the foregoing possible implementations, policy information includes at least one of the following requirements: a packet loss rate requirement, a latency requirement, a bandwidth requirement, a window size requirement, a radio channel quality requirement, a carrier requirement, and a channel quality indicator CQI filtering coefficient requirement.

In any one of the foregoing possible implementations, the execution policy includes at least one of a handover threshold, a guaranteed bit rate GBR, a maximum bit rate MBR, a packet loss rate, a latency, a jitter, a window size, and a CQI filtering coefficient.

The execution policy in this application not only includes an existing standardized execution policy, but may further include the latency, the jitter, the window size, the CQI filtering coefficient, and the like, so that the existing execution policy is extended, to further implement refined management on the execution policy.

According to a seventh aspect of this application, a communications apparatus is provided. The communications apparatus includes: a memory and a processor; the memory, configured to store a program instruction; and the processor, configured to invoke the program instruction stored in the memory, to perform the method in any one of the foregoing first aspect to the third aspect and possible implementations corresponding to the foregoing first aspect to the third aspect.

According to an eighth aspect of this application, a computer storage medium is provided. An instruction is stored in the computer-readable storage medium, and when run on a computer, the instruction enables the computer to perform any one of the methods in the foregoing first aspect to the third aspect and possible implementations corresponding to the foregoing first aspect to the third aspect.

According to a ninth aspect of this application, a computer program product including an instruction is provided, and when run on a computer, the product enables the computer to perform any one of the methods in the foregoing first aspect to the third aspect and possible implementations.

DESCRIPTION OF EMBODIMENTS

Embodiments of this application may be used in a long term evolution (LTE) network, a 5G or next generation network, a fixed network, a home NodeB network, a non-3GPP (such as Wi-Fi) access mobile network, or the like. In this application, an example in which the embodiments of this application are applied to the 5G network is used for description.

Figure 1:
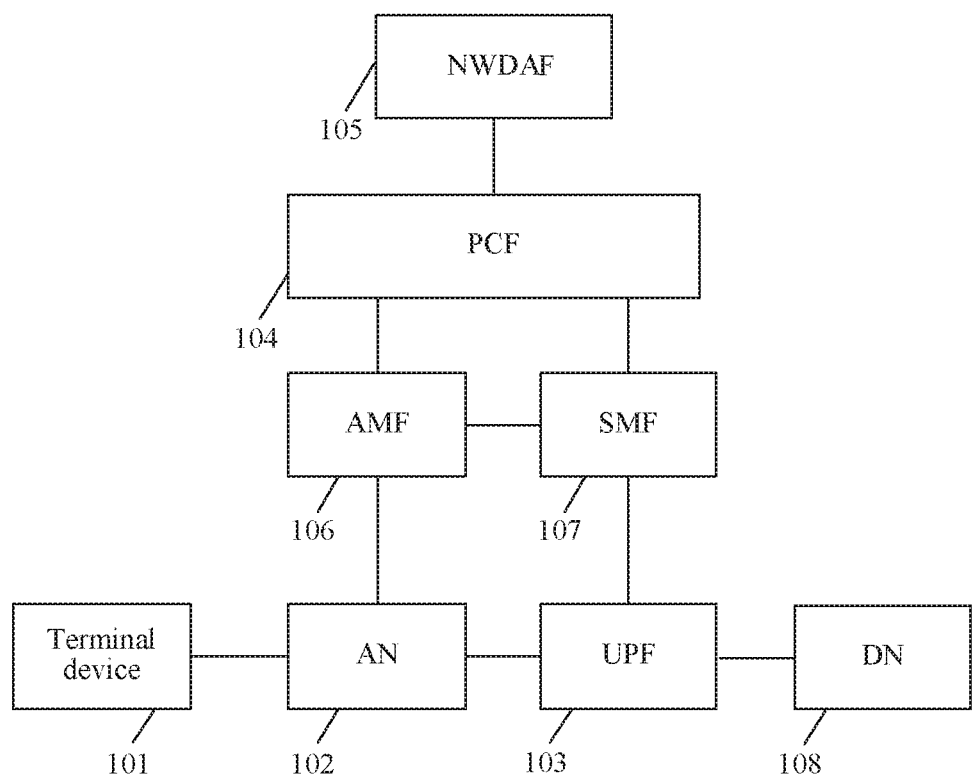
FIG. 1 is a schematic diagram of a communications system that implements an embodiment of this application.

FIG. 1 is a schematic diagram of a communications system that can implement an embodiment of this application. In the communications system, a terminal device 101 accesses a core network by using an access network (AN) device 102.

The terminal device 101 includes but is not limited to: user equipment (UE), a subscriber unit, a subscriber station, a mobile station, a mobile, a remote station, a remote terminal device, a mobile terminal device, a user terminal device, a terminal device, a wireless communications device, a user agent, a user apparatus, a cellular phone, a cordless phone, a Session Initiation Protocol (SIP) phone, a wireless local loop (WLL) station, a personal digital assistant (PDA), a handheld device having a wireless communication function, a computing device, a processing device connected to a wireless modem, a vehicle-mounted device, a wearable device, a terminal device in the Internet of Things, a household appliance, a virtual reality device, a terminal device in a future 5G network, a terminal device in a future evolved public land mobile network (PLMN), and the like.

The access network device 102 may be a device that communicates with the terminal device 101. The access network device may provide communication coverage for a specific geographic area, and may communicate with a terminal device within the covered area (a cell). The access network device 102 may communicate with any quantity of terminal devices. There may be a plurality of air interface connections between the access network device 102 and the terminal device 101. For example, there are two air interface connections between the access network device 102 and the terminal device 101, and the two air interface connections are respectively used to transmit a data flow A and a data flow B. The access network device may support communications protocols in different standards, or may support different communication modes. For example, the access network device 102 is an evolved NodeB (eNodeB), a wireless fidelity access point (Wi-Fi AP), a worldwide interoperability for microwave access base station (WiMAX BS), or a radio controller in a cloud radio access network (CRAN), or the network device may be an access network device in the future 5G network or an access network device in the future evolved PLMN, or the like.

The core network may include: a control plane function (CPF) network element, a user plane function (UPF) network element 103, a policy control function (PCF) network element 104, and an NWDAF network element 105. The control plane function network element may include: an access management function (AMF) network element 106 and a session management function (SMF) network element 107. By using the access network device 102 and the user plane function network element 103, transmission of user plane data between the terminal device 101 and a data network (DN) 108 may be implemented.

The PCF network element 104 has a policy control decision function, and provides a policy for a network. The NWDAF network element 105 is used for big data learning and analytics. The AMF network element 106 is used for mobility management, lawful interception, access authorization, authentication, and the like. The SMF network element 107 is configured to implement session and bearer management, address allocation, and the like. The DN 108 is a network used to transmit data. Specifically, the DN 108 may comprise an internet protocol (IP) multimedia subsystem (IMS) server, a packet data network (PDN), or a network managed and controlled by an application server (App Server).

It can be understood that in the communications system shown in FIG. 1, functions of various composition network elements are merely an example. When the various composition network elements are applied to the embodiments of this application, not all the functions are necessarily needed.

"And/or" in the embodiments of this application describes only an association relationship for describing associated objects and represents that three relationships may exist. For example, A and/or B may represent the following three cases: Only A exists, both A and B exist, and only B exists. In addition, in the descriptions of this application, "a plurality of" means two or more than two.

In the embodiments of this application, that a network element (such as a network element A) obtains information from another network element (such as a network element B) may mean that the network element A directly receives information from the network element B, or may mean that the network element A receives information from the network element B by using another network element (such as a network element C). When the network element A receives the information from the network element B by using the network element C, the network element C may transparently transmit the information, or may process the information. For example, the network element C adds the information to different messages for transmission or filters the information, and sends only filtered information to the network element A. Similarly, in various embodiments of this application, that the network element A sends information to the network element B may mean that the network element A directly sends the information to the network element B, or may mean that the network element A sends the information to the network element B by using another network element (such as the network element C).

Figure 2:
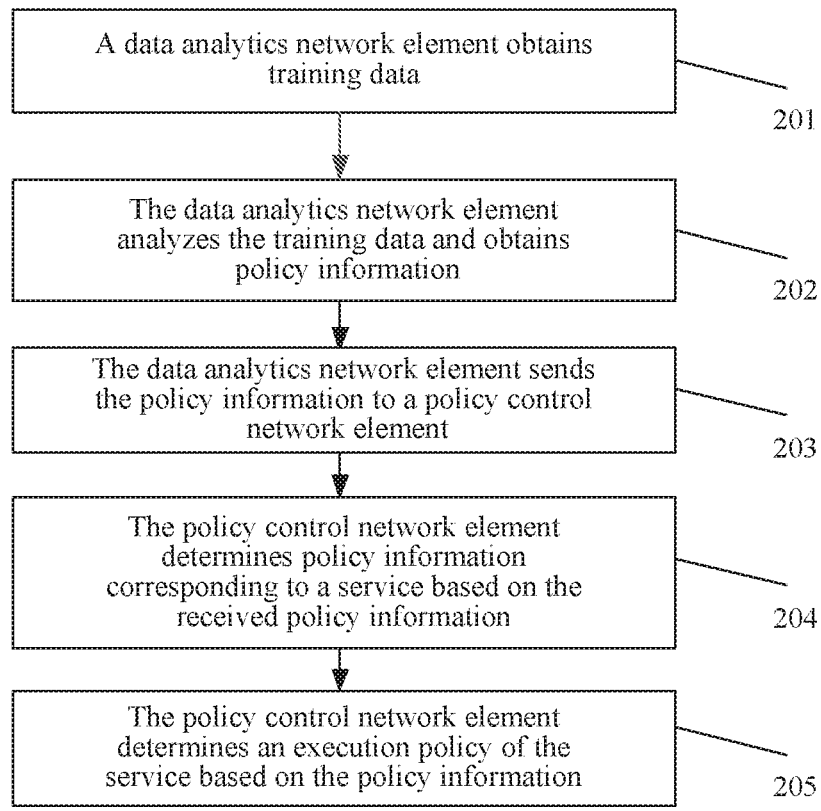
FIG. 2 is a schematic flowchart of a policy determining method according to a first embodiment of this application.

FIG. 2 is a schematic flowchart of a policy determining method according to a first embodiment of this application. The method includes the following steps.

Step 201. A data analytics network element obtains training data.

The data analytics network element may be the NWDAF network element in FIG. 1. The data analytics network element may alternatively be another network element having a network data analytics function, and this is not limited herein.

The data analytics network element may obtain the training data from another network element, or the data analytics network element may obtain the training data from a same network element set. Specifically, the another network element may be a telecommunications network device, or may be a third party server. The telecommunications network device may be at least one of the following devices: a terminal device, an access network device, a control plane function network element (such as an AMF network element or an SMF network element), a UPF network element, a PCF network element, a network management system (such as a business support system (BSS), an operation support system (OSS), or a management support system (MSS)) network element, a unified data management (UDM)) network element, and an IMS network element. The third party server may be at least one of an App Server, an OTT (over the top) server, and a vertical industry control and management center.

The data analytics network element may directly obtain the training data by performing data exchange with the another network element. Alternatively, the data analytics network element may indirectly obtain the training data by using the another network element. For example, the data analytics network element obtains data from the third party server by using a network exposure function (NEF) network element.

The data analytics network element may obtain the training data from the another network element in real time, or the data analytics network element may obtain the training data when the data analytics network element and/or the another network element are/is idle.

The training data obtained by the data analytics network element may be original data. The training data obtained by the data analytics network element may alternatively be data pre-processed by the another network element. For example, to protect user privacy, an application server cleans sensitive information in the original data, and sends processed data to the data analytics network element.

The training data obtained by the data analytics network element may be network data, such as an address, a cell identifier (cell ID), time information, and a network congestion situation that are of a terminal device. The training data obtained by the data analytics network element may alternatively be application data, such as an IP 5-tuple, a user plane data size, a user plane data interval, a service type, service experience, or an extended field. The data analytics network element may further associate the obtained application data with the obtained network data, and obtain training data after the association. For example, the data analytics network element associates the application data with the network data based on the address and/or time information of the terminal device. The address of the terminal device may be an IP address, or may be an Ethernet address.

The data analytics network element may obtain the training data by using a service type as a granularity. For example, the data analytics network element respectively obtains training data of a payment service and training data of a voice over long term evolution (VoLTE) service.

Alternatively, the data analytics network element may obtain the training data by using a network element as a granularity. For example, training data obtained from the terminal device may include: a type of the terminal device, an address of the terminal device, a version of an operating system, a temperature of the terminal device, an electricity quantity of the terminal device, cell radio channel quality (for example, RSRP, RSRQ, and an SINR) measured by the terminal device, a congestion level, and the like. Training data obtained from a session management network element may include: an identifier (ID) of the session management network element, a quality of service (QoS) indicator, an address of the terminal device, a data network name (DNN), and the like. Training data obtained from an access management function network element may include: an access management function network ID, a DNN, a type of the terminal device, a cell identifier (cell ID), a congestion level, and the like. Training data obtained from a user plane function network element may include: a user plane function network element ID, a tunnel end point identifier (TEID), a congestion level, an IP 5-tuple, a user plane data size, a quantity of pieces of user plane data, and the like. Training data obtained from the UDM network element may include: a UDM network element ID, an AMF network element ID, a DNN, a subscription session aggregate maximum bit rate (AMBR), and a public land mobile network (PLMN). Training data obtained from an application function (AF) network element may include: IP filtering information (such as an IP address and a port of UE, an address and a port of an OTT server, or a transmission protocol), an encoding type, an encoding rate, a bandwidth requirement, a packet time of a data packet, a congestion level, and the like. Training data obtained from the access network device may include: a cell identifier, a QoS parameter, real-time radio channel quality (such as reference signal received power (RSRP), reference signal received quality (RSRQ), a signal to interference plus noise ratio (SINR)), a service handover threshold, a filtering coefficient, an antenna tilt, a carrier frequency, a carrier, a packet loss rate, a guaranteed bit rate (GBR), a maximum bit rate (MBR), a congestion level, and the like. Training data obtained from the third party server may include: an IP 5-tuple, a start time, an end time, a service type, and the like. The foregoing training data obtained by using a network element as a granularity is used only as an example for description, and this application is not limited herein.

Step 202. The data analytics network element analyzes the training data and obtains policy information.

In this embodiment of this application, the policy information may be a parameter related to a policy, that is, a feature parameter used to determine the policy, for example, at least one of a packet loss rate requirement, a latency requirement, a bandwidth requirement, a window size requirement, a radio channel quality requirement, a carrier requirement, and a channel quality indicator CQI filtering coefficient requirement.

The data analytics network element may obtain policy information corresponding to a service type by using a service type as a granularity, for example, policy information corresponding to a video service, policy information corresponding to a payment service, and policy information corresponding to a VoLTE service. In a possible implementation, the policy information may include a service type corresponding to the policy information. In various embodiments of this application, the service type may be a specific service type, or may be a number corresponding to the service type or indication information corresponding to the service type. This is not limited herein.

One service type may correspond to at least one policy information. Optionally, in different conditions, the service type corresponds to different policy information. For example, in different radio channel environments, the VoLTE service corresponds to different policy information.

The data analytics network element may obtain the policy information by using a statistics collection method. The following uses an example of obtaining policy information corresponding to the VoLTE service for description.

Training data that is of the VoLTE service and that is obtained by the data analytics network element is shown in FIG. 1. A parameter that is of the VoLTE service and that is obtained by the data analytics network element includes a type of the terminal device, an IP address of the terminal device, a cell identifier, real-time radio channel quality, a service handover threshold, an encoding type, an encoding rate, a start time of obtaining the training data, an end time of obtaining the training data, and service experience. The service experience is estimated by using a mean opinion score (MOS). The MOS is used to describe voice quality and is usually in a range of [0, 5], in which a larger value indicates higher voice quality, and 3.0 is a voice standard score. For the VoLTE service, the type of the terminal device, the IP address of the terminal device, the cell identifier, and the real-time radio channel quality are non-adjustable parameters, and the service handover threshold, the encoding type, and the encoding rate are adjustable parameters.

TABLE 1

| Type of the terminal device | iPhone5s | iPhone5s | iPhone5s | iPhone5s | iPhone5s |
|---|---|---|---|---|---|
| IP address of the terminal device | 215.218.216.104 | 103.218.216.128 | 203.22.315.11 | 233.156.216.104 | 120.218.185.119 |
| Cell ID | 6010003 | 6010003 | 6010003 | 6010003 | 6010003 |
| Real-time radio channel quality (RSRP) | −119 dBm | −120 dBm | −117 dBm | −116 dBm | −115 dBm |
| Service handover threshold (RSRP) | −115 dBm | −115 dBm | −115 dBm | −115 dBm | −115 dBm |
| Encoding type | AMR-WB | AMR-WB | AMR-WB | AMR | AMR |
| Encoding rate | 23.85 | 23.85 | 23.85 | 12.2 | 12.2 |
| Start time | 12:00:00 | 12:00:00 | 12:00:00 | 12:00:00 | 12:00:00 |
| End time | 12:04:00 | 12:11:00 | 12:01:00 | 12:05:00 | 12:09:00 |
| Service experience (MOS) | 3.0 | 2.5 | 3.8 | 3.5 | 3.0 |

As shown in Table 1, it can be learned that for the VoLTE service, when the type of the terminal device is iPhone5s and the cell identifier is 6010003, different encoding types and encoding rates correspond to different radio channel quality requirements. For example, for a terminal device having the encoding type of AMR-WB and the encoding rate of 23.85, when service experience (MOS) is greater than or equal to 3.0, call quality can be guaranteed. Therefore, radio channel quality −119 dBm when the MOS is 3.0 can be set as a radio channel quality requirement in this case. Similarly, for a terminal device having the encoding type of AMR and the encoding rate of 12.2, radio channel quality −115 dBm when the MOS is 3.0 can be set as a radio channel quality requirement in this case. Correspondingly, as shown in Table 2, radio channel quality requirements in different network situations can be obtained.

TABLE 2

| Type of terminal device | iPhone5s | iPhone5s |
|---|---|---|
| Time | 12:00:00 | 12:00:00 |
| Cell ID | 6010003 | 6010003 |
| Encoding type | AMR-WB | AMR |
| Encoding rate | 23.85 | 12.2 |
| Radio channel quality requirement (RSRP) | −119 dBm | −115 dBm |

The data analytics network element may alternatively obtain the policy information by using a method for constructing a model. The data analytics network element may construct a linear regression model, and the following is a target function:

$$h(x) = w_0 x_0 + w_1 x_1 + w_2 x_2 + w_3 x_3 + \ldots + w_D x_D, \text{ where}$$

$h(x)$ is a MOS score corresponding to the model, $X=(x_0, x_1, x_2, x_3, \ldots, x_D)$ is a set of sample data, $x_0$ is always 1, $x_i$ ($i=1, 2, \ldots, D$) is a feature (factor) of the set of sample data, that is, a feature corresponding to a service type, for example, a time, a cell identifier, real-time radio channel quality, a congestion level, an encoding type, an encoding rate, a packet loss rate, a latency, a bandwidth, a window size, radio channel quality, a carrier, or a CQI filtering coefficient, $W=(w_0, w_1, w_2, w_3, \ldots, w_D)$ is a model coefficient, and D is a quantity of features in the set of sample data.

Specifically, the model coefficient W may be obtained by using the following loss function, $$C(x) = \Sigma_{j=1}^{N}(z^j - h(x^j))^2$$

where $x_j = (x_0^j, x_1^j, x_2^j, x_3^j, \ldots, x_D^j)$ is one piece of specific sample data, $z^j$ is an actual MOS score value corresponding to the specific sample data, and N is a set number of the sample data.

A process of big data training may be described as: Find a set of parameters $W=(w_0, w_1, w_2, w_3, \ldots, w_D)$ that is in a sample set $(x^1, x^2, x^3, \ldots, x^N)$ corresponding to the training data and that enables a value of the loss function $C(x)$ to be minimum. In the training process, a feature selection may further be performed, and a key feature that affects the service experience (MOS) is obtained. For example, for the VoLTE service, the key feature may be the type of the terminal device, the time, the cell ID, the encoding type, the encoding rate, the radio channel quality, or the like.

Step 203. The data analytics network element sends the policy information to a policy control network element.

The policy control network element may be the PCF network element in FIG. 1, or may be another network element having a policy control function. This is not limited herein.

The data analytics network element may simultaneously send policy information corresponding to a plurality of service types to the policy control network element, or the data analytics network element may separately send policy information corresponding to a plurality of service types to the policy control network element. The data analytics network element may actively send the policy information to the policy control network element, or may send the policy information based on a request of the policy control network element. The data analytics network element may send the policy information to the policy control network element in real time, or may send the policy information to the policy control network element when the network is idle. This is not limited herein.

The data analytics network element may send the policy information to the policy control network element in two manners.

Manner 1:

The data analytics network element may actively send the policy information obtained in step 202 and the service type corresponding to the policy information to the policy control network element. For example, the data analytics network element may send the VoLTE type and information in Table 2 to the policy control network element.

Manner 2:

The data analytics network element may alternatively receive a service type that is of a to-be-sent service and that is sent from the policy control network element. The data analytics network element determines, based on the received service type, in the policy information obtained in step 202, policy information of a service corresponding to the service type, that is, policy information of the to-be-sent service. The service type of the to-be-sent service may be included in a request message, or may be implemented by invoking a servitization program, and this is not limited herein.

The data analytics network element may alternatively receive a network parameter of a network in which the service corresponding to the service type sent from the policy control network element is located, that is, an existing network parameter of a network in which the to-be-sent service is located. The network parameter may be a parameter used to determine the policy information, for example, a packet loss rate, a latency, a bandwidth, a window size, radio channel quality, a carrier, or a channel quality indicator filtering coefficient. The network parameter of the network in which the service is located may be obtained by the policy control network element, or may be obtained by another network element and then sent to the policy control network element, for example, obtained by a UPF network element and then sent to the policy control network element. The network parameter of the network in which the service is located may alternatively be obtained by the policy control network element and another network element, and this is not limited herein.

The data analytics network element may alternatively obtain information that is about a terminal device and that corresponds to a service. For example, the data analytics network element receives, from the policy control network element, the information that is about the terminal device and that corresponds to the service. The information of the terminal device may be identification information of the terminal device and/or address information of the terminal device. The data analytics network element obtains, from a corresponding network element based on the information about the terminal device, the network parameter of the network in which the service is located, for example, obtains a cell identifier and a type of the terminal device from an access management function network element; and an encoding type and an encoding rate from an application function network element. Certainly, the data analytics network element may alternatively obtain, from another network element, the information that is about the terminal device and that corresponds to the service, and this is not limited herein.

In various embodiments of this application, the data analytics network element may receive a request message of the policy control network element. The request message includes at least one of the service type of the to-be-sent service, the network parameter of the network in which the service of the service type is located, and the information that is about the terminal device and that corresponds to the service.

The data analytics network element determines, based on the network parameter and the service type, in the policy information obtained in step 202, policy information of a service corresponding to the service type. For example, for the VoLTE service, if the type of the terminal device in the request message is iPhone5s, the time is 12:00:00, the cell ID is 6010003, the encoding type is AMR-WB, and the encoding rate is 23.85, the data analytics network element can learn from Table 2 that a radio channel quality requirement of the VoLTE service is −119 dBm. The data analytics network element sends the radio channel quality requirement −119 dBm as policy information of the VoLTE service to the policy control network element.

In a possible implementation, the data analytics network element sends the policy information to the policy control network element by using a packet data unit (PDU) session establishment/modification process. For example, in the PDU session establishment process, a default QoS flow is established. In a process of establishing the default QoS flow, a PCF network element may receive a DNN from an SMF network element or identification information (such as an IMSI or an IMEI) of the terminal device. The PCF network element sends a request message to the data analytics network element to request the policy information. The request message may include the DNN or the identification information of the terminal device. After receiving the request message, if determining that the DNN is an IMS DNN, the data analytics network element may send policy information of only two services: a VoLTE and a ViLTE; or if determining, based on the identification information (such as the IMEI) of the terminal device, that a type of the terminal device is iPhone, the data analytics network element sends policy information only related to iPhone, for example, policy information of an iPhone game.

In this application, when a specific parameter is related, the specific parameter is merely an example used for easy understanding. This application does not limit a type and a value of various parameters.

Step 204. The policy control network element determines, based on the received policy information, policy information corresponding to a service.

Specifically, corresponding to two manners in which the data analytics network element sends the policy information in step 203, the policy control network element determines the policy information corresponding to the service in the following two manners:

Manner 1:

If the data analytics network element actively sends policy information corresponding to a plurality of service types to the policy control network element, the policy control network element receives a service type that is of a to-be-sent service and that is sent from the session management network element. The policy control network element determines, based on the service type, the policy information corresponding to the service type in the plurality of received policy information. The policy control network element may further receive at least one of a network parameter that is of a network in which the service is located and that is sent from the session management network element and information that is about the terminal device and that corresponds to the service. The policy control network element determines, based on the at least one of the network parameter that is of the network in which the service is located and the information that is about the terminal device and that corresponds to the service, the policy information corresponding to the service in the received policy information. For specific descriptions, refer to descriptions of the manner 2 in which the data analytics network element determines the policy information in step 203. In a possible implementation, the policy control network element receives a request message sent from the session management network element, where the request message includes at least one of the service type of the to-be-sent service, the network parameter that is of the network in which the service is located, and the information that is about the terminal device and that corresponds to the service.

Manner 2:

Corresponding to the manner 2 in step 203, the policy control network element determines the policy information received from the data analytics network element as the policy information corresponding to the to-be-sent service.

Step 205. The policy control network element determines an execution policy of the service based on the policy information.

The policy control network element converts the policy information corresponding to the service into the execution policy corresponding to the service. The execution policy may include at least one of a control policy, a charging policy, a policy and charging control (PCC) rule. Specifically, the execution policy may include at least one of a handover threshold, a GBR, an MBR, a packet loss rate, a latency, a jitter, a window size, and a CQI filtering coefficient. For example, the policy control network element determines a radio channel quality requirement in the policy information as the handover threshold, and the bandwidth requirement as the GBR and/or MBR. For the VoLTE service, based on descriptions in step 203, it can be learned that a radio channel quality requirement of the VoLTE service is −119 dBm, so that the handover threshold is determined as −119 dBm instead of a standard handover threshold −115 dBm.

After determining the execution policy of the service, the policy control network element may further send the execution policy of the service to the session management network element. The session management network element may send the execution policy to at least one of a user plane network element, an access network management network element, an access network device, and a terminal device, so that a network element receiving the execution policy processes service data based on the execution policy.

In this embodiment of this application, the policy control network element obtains the policy information from the data analytics network element; and determines the execution policy of the service based on the obtained policy information. Compared with the prior art in which a fixedly configured execution policy or a standardized execution policy is used, the policy determining method in this embodiment of this application can implement dynamic adjustment and refined management on the execution policy.

In this embodiment of this application, the data analytics network element further obtains an updated network parameter of the network in which the service of the service type is located; and determines, based on the updated network parameter, updated policy information. Specifically, the data analytics network element may collect a current network parameter in real time, and determine whether a current network situation satisfies a corresponding execution policy. If the current network situation cannot satisfy the corresponding execution policy, the data analytics network element re-determines, by using the current network parameter, new policy information according to the method in step 203, that is, obtains the updated policy information. The data analytics network element then sends the updated policy information to the policy control network element. For specific descriptions, refer to step 203. The policy control network element determines, based on the updated policy information, the updated execution policy of the service. For specific descriptions, refer to step 204 and step 205. In a possible implementation, when analyzing the network parameter, if determining that a QoS rule in a current QoS flow cannot be satisfied, the data analytics network element initiates a QoS parameter updating procedure of a dedicated QoS flow and sends the updated policy information to the PCF network element.

In a possible implementation, the data analytics network element may input the obtained current network parameter into the model in step 202, to determine whether the current network situation satisfies service experience. If the current network situation cannot satisfy the service experience, the policy information is updated. For example, for the VoLTE service, the terminal device currently uses AMR coding, and real-time radio channel quality is −116 dBm. If the data analytics network element determines, based on the current network parameter, that a current handover threshold of the VoLTE service is −115 dBM, and that a voice MOS is less than 3.0, the data analytics network element can update the policy information. For example, an encoding type of the terminal device is determined as an encoding type, such as EVS coding, or AMR-WB coding, that has a lower requirement on radio channel quality, and the handover threshold of the VoLTE service is adjusted as −122 dBm (corresponding to the EVS coding) or −119 dBm (corresponding to the AMR-WB coding).

In another possible implementation, the data analytics network element may predict, based on the current network parameter, a future change on service experience. If predicting that future service experience becomes poor, the data analytics network element may update policy information of the service in advance, to avoid poor service experience. For example, for the VoLTE service, the terminal device currently uses AMR coding, and a service handover threshold is −115 dBm. If determining that real-time radio channel quality becomes poor, that a voice MOS becomes lower, and that the trend is obvious, the data analytics network element determines an encoding type of the terminal device to be an encoding type that has a lower requirement on radio channel quality, for example, EVS coding or AMR-WB coding, and adjusts the handover threshold of the VoLTE service to −122 dBm (corresponding to the EVS coding) or −119 dBm (corresponding to the AMR-WB coding).

In the prior art, after the PDU session is established, some services (such as a payment service, or a video service) are transmitted through the default flow: Service data flows (SDF) of the services are aggregated into the default QoS flow in the PDU session by using an aggregation technology. However, QoS parameters of the default QoS flow are usually stored in a subscription server when a user signs a subscription. The QoS parameters are for the default QoS flow in the whole PDU session, and cannot be used to perform refined control on a specific data service in the default QoS flow.

Figure 3:
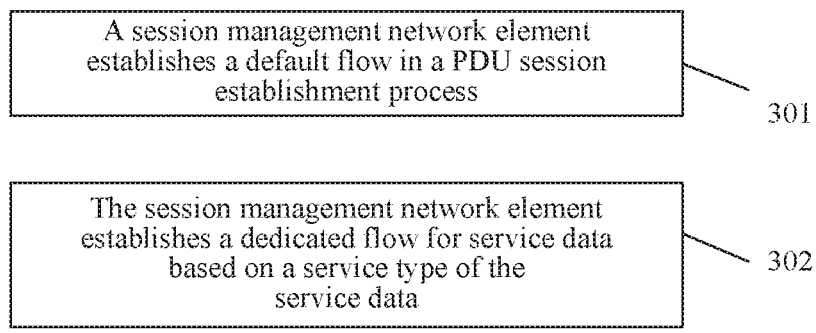
FIG. 3 is a schematic flowchart of a session management method according to a second embodiment of this application.

To resolve the foregoing problem, a second embodiment of this application provides a session management method. With reference to FIG. 3, the session management method includes the following steps.

Step 301. A session management network element establishes a default flow in a PDU session establishment process.

The session management network element may be the SMF network element in FIG. 1. The default flow is used to transmit service data, such as data of a payment service, or data of a video service.

For a specific process in which the session management network element establishes the default flow, refer to the prior art.

Step 302. The session management network element establishes a dedicated flow for the service data based on a service type of the service data.

Specifically, the session management network element obtains the service type of the service data. For example, the session management network element may receive a message from a user plane network element, where the message includes the service type of the service data.

The user plane network element may obtain the service type of the service data in the following manners.

Manner 1: A data analytics network element may obtain the service type of the service data by using a big data analytics method, and then send the service type of the service data to the session management network element.

Manner 2: The user plane network element may be deployed on a third-party service platform. A big data model that can identify the service type is deployed on the third-party service platform, and the user plane network element can obtain the service type of the service data by using the big data model.

Manner 3: A big data model that can identify the service type is deployed on a third-party service platform, and the third-party service platform can obtain the service type of the service data by using the big data model. By padding a field of a data packet with the service type, the third-party service platform sends the service type of the service data to the user plane network element. Specifically, the third-party service platform may pad a DSCP field of an IP data packet or a header field of a TCP data packet with the service type.

For a procedure in which the session management network element establishes the dedicated flow for the service data, refer to the prior art. A difference lies in that a request message sent from the session management network element to a policy control network element includes the service type of the service data. The policy control network element determines, based on the method in step 204 and step 205 in the first embodiment, an execution policy corresponding to the service data, and then sends the determined execution policy to the session management network element. The session management network element establishes the dedicated flow for the service data based on the determined execution policy.

In the session management method in this embodiment, the dedicated flow for a specific data service in the default QoS flow can be established, and the corresponding execution policy for the service data is determined, so that dynamic adjustment and refined management on data transmission can be implemented.

Figure 4:
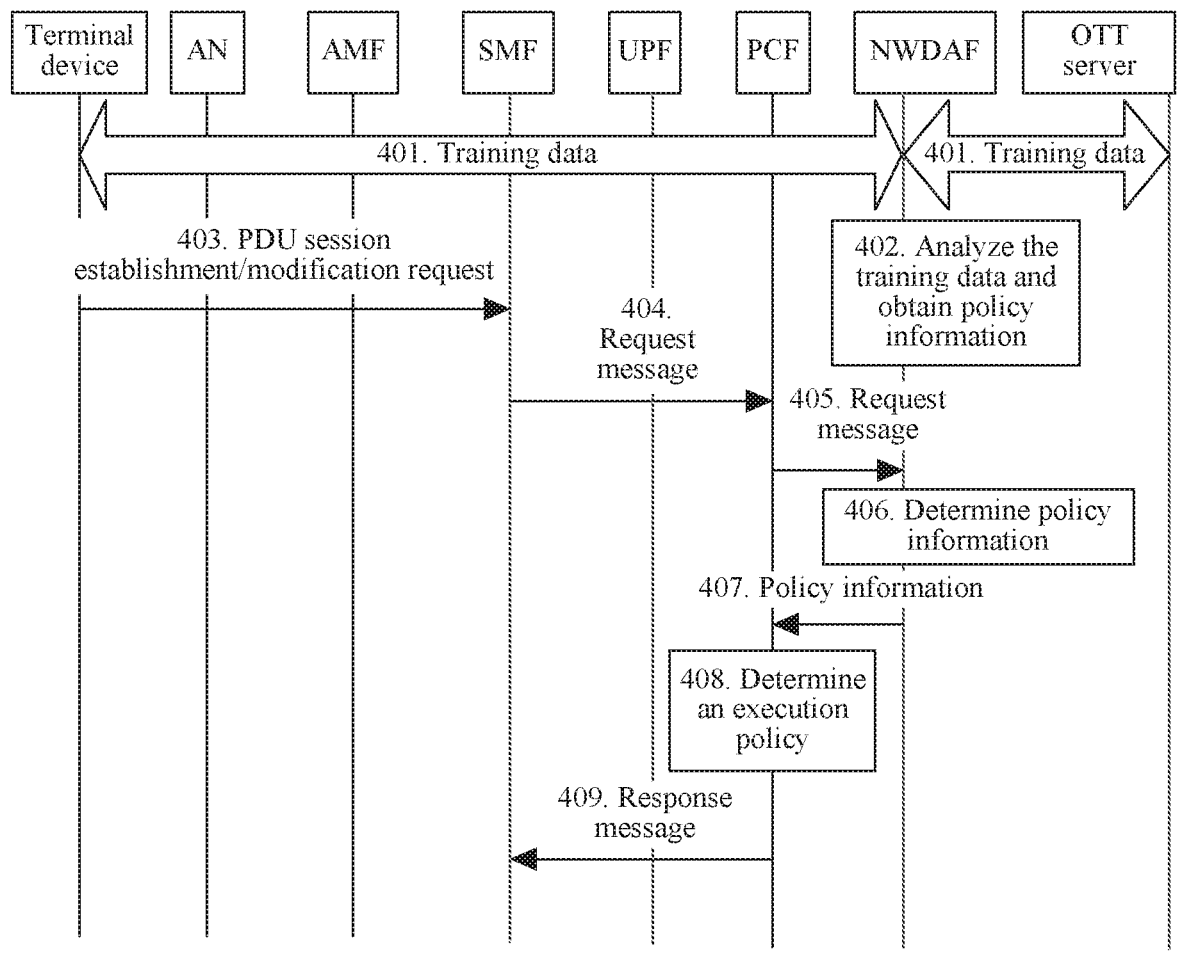
FIG. 4 is a schematic flowchart of a policy determining method according to a third embodiment of this application.

FIG. 4 is a flowchart of a policy determining method according to a third embodiment of this application. In this embodiment, an example in which a data analytics network element is an NWDAF network element, and a policy control network element is a PCF network element is used for description. In this embodiment, the NWDAF network element sends policy information based on a request of the PCF network element. For content in this embodiment that is the same as that in the first embodiment, refer to descriptions of the first embodiment. The policy determining method in this embodiment includes the following steps:

401. The NWDAF network element obtains training data.

For a method in which the NWDAF network element obtains the training data, refer to step 201, and details are not described herein again.

402. The NWDAF network element analyzes the training data and obtains policy information.

Specifically, for the step, refer to step 202, and details are not described herein again.

403. A terminal device requests, by using an AMF network element, to initiate a PDU session establishment/modification procedure to an SMF network element.

For the step, refer to a process in which a terminal device initiates a PDU session establishment/modification request in the prior art.

The step may alternatively be: An AF (Application Function) requests to initiate a PDU session modification procedure. For the step, refer to a PDU session modification request process initiated by an AF in the prior art.

404. The SMF network element sends a request message to the PCF network element to request an execution policy related to the PDU session.

For the step, refer to a PDU connectivity access network (PDU-CAN) session establishment/modification procedure initiated by an SMF in the prior art.

The request message includes a service type of a service requested by a terminal device. The request message may further include a name of a data network (DNN) in which the service requested by the terminal device is located and/or identification information of the terminal device.

405. The PCF network element sends the request message to the NWDAF network element to request policy information.

The request message includes the service type of the service requested by the terminal device. The request message may further include the name of the data network in which the service requested by the terminal device is located and/or the identification information of the terminal device.

406. After receiving the request message sent from the PCF network element, the NWDAF network element determines policy information from the policy information obtained in step 402.

The NWDAF network element may determine, based on the service type in the request message, policy information corresponding to the service type.

The NWDAF network element may alternatively determine, based on the name of the data network and/or the identification information of the terminal device that are/is in the request message, corresponding policy information in the policy information obtained in step 402. For specific descriptions, refer to descriptions in step 203.

407. The NWDAF network element sends the determined policy information to the PCF network element.

For specific descriptions, refer to descriptions in step 203. In this step, the NWDAF network element may further send the service type corresponding to the policy information to the PCF network element.

408. The NWDAF network element determines, based on received policy information, an execution policy corresponding to the policy information.

For specific descriptions, refer to descriptions in step 205.

409. The PCF network element sends a response message to the SMF network element.

The response message includes the execution policy determined in step 408. After receiving the response message, the SMF network element may send the execution policy to at least one of a UPF network element, an AMF network element, an access network device, and the terminal device, so that a network element receiving the execution policy processes data based on the execution policy.

Figure 5:
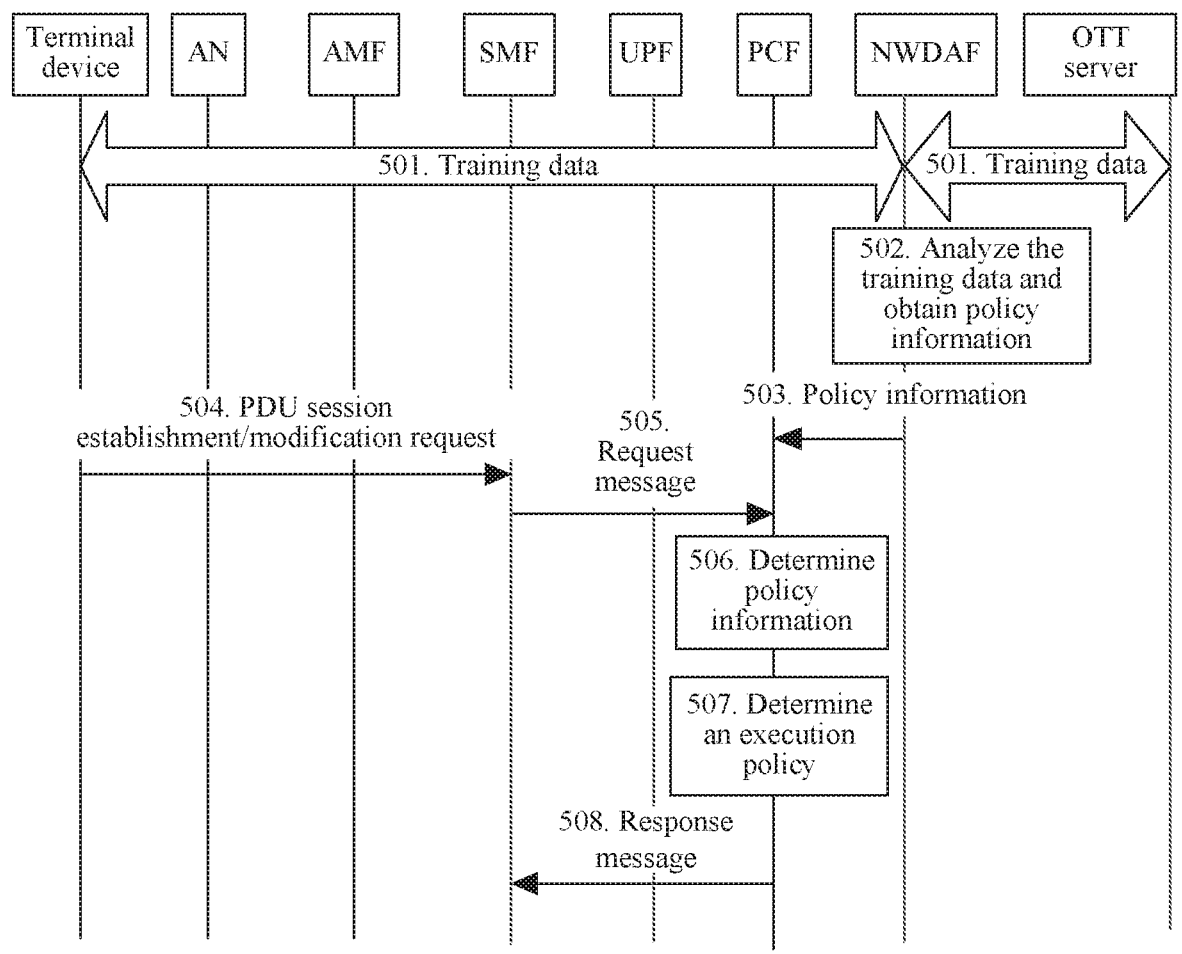
FIG. 5 is a schematic flowchart of a policy determining method according to a fourth embodiment of this application.

FIG. 5 is a flowchart of a policy determining method according to a fourth embodiment of this application. In this embodiment, an NWDAF network element actively sends policy information to a PCF network element. For content in this embodiment that is the same as that in the first embodiment, refer to descriptions of the first embodiment. The policy determining method in this embodiment includes the following steps:

501. The NWDAF network element obtains training data.

For a method in which the NWDAF network element obtains the training data, refer to step 201, and details are not described herein again.

502. The NWDAF network element analyzes the training data and obtains policy information.

Specifically, for the step, refer to step 202, and details are not described herein again.

503. The NWDAF network element sends the policy information obtained in step 502 to a PCF network element.

The NWDAF network element may further send a service type corresponding to the policy information to the PCF network element. For specific descriptions, refer to descriptions in step 203.

504. A terminal device requests, by using an AMF network element, to initiate a PDU session establishment/modification procedure to an SMF network element.

For the step, refer to a process in which a terminal device initiates a PDU session establishment/modification request in the prior art.

The step may alternatively be: An AF (Application Function) requests to initiate a PDU session modification procedure. For the step, refer to a PDU session modification request process initiated by an AF in the prior art.

505. The PCF network element sends a request message to the NWDAF network element to request policy information.

For specific descriptions, refer to descriptions in step 404.

506. After receiving the request message, the PCF network element determines policy information from the policy information obtained in step 503.

The PCF network element may determine, based on a service type in the request message, policy information corresponding to the service type.

The PCF network element may alternatively determine, based on a name of a data network and/or identification information of the terminal device that are/is in the request message, corresponding policy information in the policy information obtained in step 503. For specific descriptions, refer to descriptions in step 203.

507. The PCF network element determines, based on the policy information determined in step 506, an execution policy corresponding to the policy information.

For specific descriptions, refer to descriptions in step 205.

508. The PCF network element sends a response message to the SMF network element.

The response message includes the determined execution policy in step 507. After receiving the response message, the SMF network element may send the execution policy to at least one of a UPF network element, an AMF network element, an access network device, and the terminal device, so that a network element receiving the execution policy processes data based on the execution policy.

Figure 6:
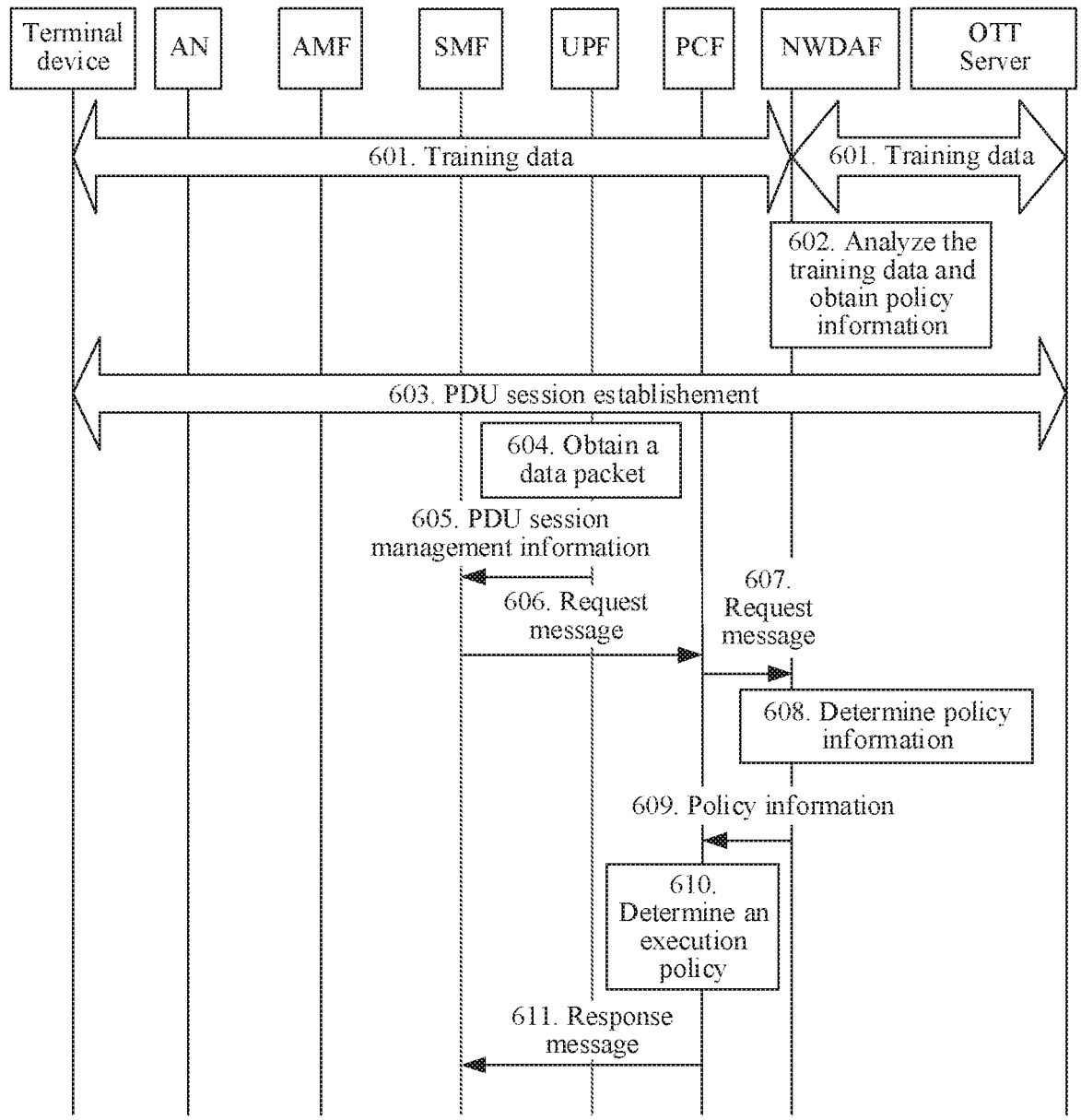
FIG. 6 is a schematic flowchart of a policy determining method according to a fifth embodiment of this application.

FIG. 6 is a flowchart of a session management method according to a fifth embodiment of this application. In this embodiment, an example in which a data analytics network element is an NWDAF network element, and a policy control network element is a PCF network element is used for description. For content in this embodiment that is the same as that in the first embodiment or the second embodiment, refer to descriptions of the first embodiment or the second embodiment. The session management method in this embodiment includes the following steps.

601. The NWDAF network element obtains training data.

For a method in which the NWDAF network element obtains the training data, refer to step 201, and details are not described herein again.

602. The NWDAF network element analyzes the training data and obtains policy information.

Specifically, for the step, refer to step 202, and details are not described herein again.

603. Establish a QoS flow for a to-be-sent service by using a PDU session establishment/modification procedure.

The QoS flow may be a default QoS flow. For example, the QoS flow may be a default QoS flow established in a PDU session establishment process. For a procedure of establishing the QoS flow, refer to the prior art, or refer to descriptions of the third embodiment and the fourth embodiment in this application.

For some service data, such as data of a payment service or data of a video service, corresponding service data flows are aggregated into the default QoS flow in the PDU session by using an aggregation technology.

To implement refined management on the services, in the session management method in this embodiment, after the default QoS flow is established, a dedicated QoS flow is established for the services. Specific steps are shown below:

604. A UPF network element receives a data packet.

The UPF network element receives the data packet through the QoS flow established in step 603.

The UPF network element obtains a service type corresponding to the data packet. The UPF network element may obtain the service type corresponding to the data packet by using a big data analytics method.

605. The UPF network element sends session management information to an SMF network element.

The session management information is used to initiate a PDU session modification procedure, to establish a dedicated QoS flow for a service corresponding to the data packet. The session management information includes the service type corresponding to the data packet.

Specifically, for 606 to 611, refer to descriptions in steps 404 to 409.

Figure 7:
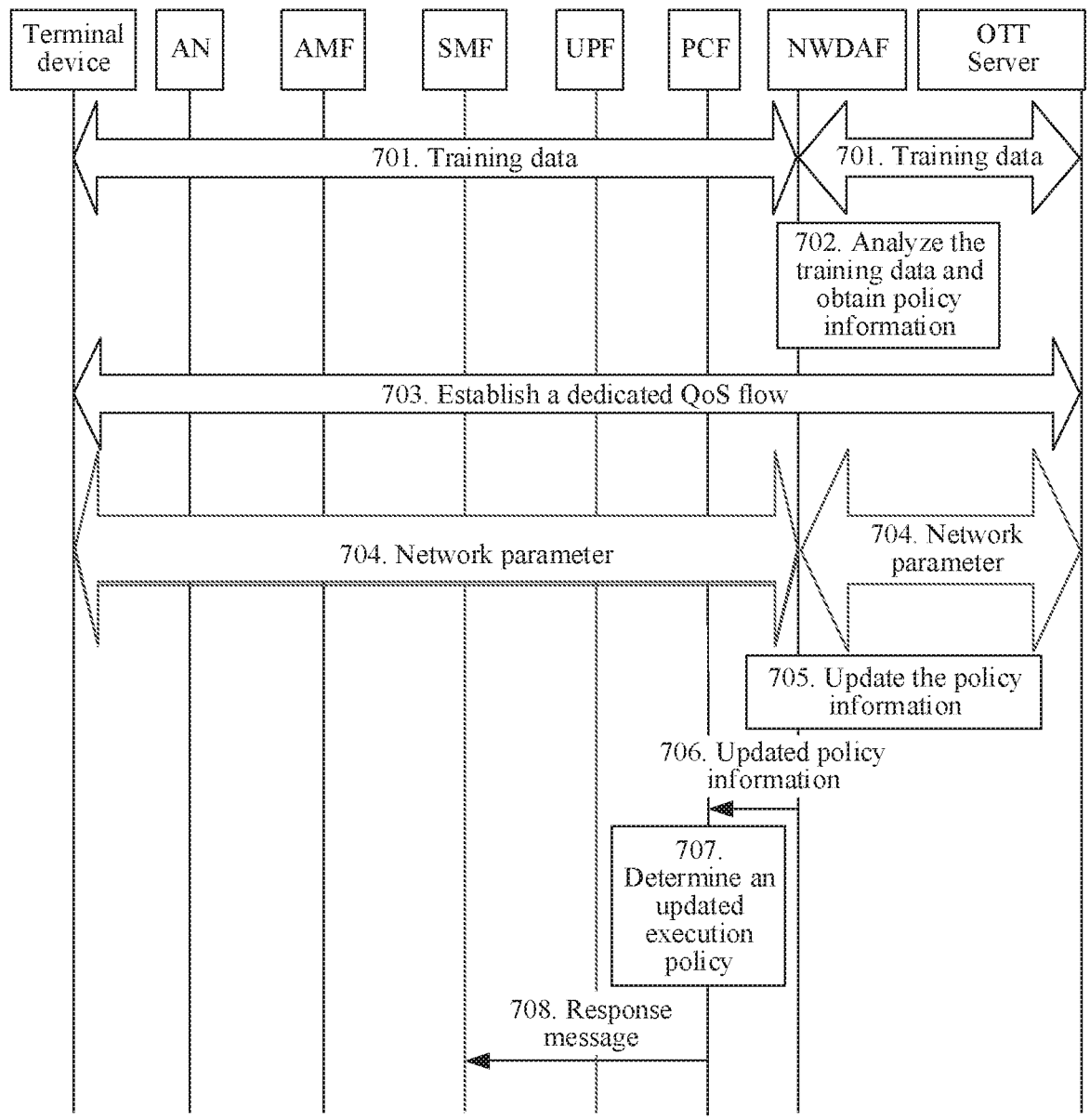
FIG. 7 is a schematic flowchart of a session management method according to a sixth embodiment of this application.

FIG. 7 is a flowchart of a policy determining method according to a sixth embodiment of this application. For content in this embodiment that is the same as that in the first embodiment or the second embodiment, refer to descriptions of the first embodiment or the second embodiment. The session management method in this embodiment includes the following steps.

701. An NWDAF network element obtains training data.

For a method in which the NWDAF network element obtains the training data, refer to step 201, and details are not described herein again.

702. The NWDAF network element analyzes the training data and obtains policy information.

Specifically, for the step, refer to step 202, and details are not described herein again.

703. Establish a dedicated QoS flow for a to-be-sent service.

For a procedure of establishing the dedicated QoS flow, refer to the prior art, or refer to descriptions of the third embodiment and the fourth embodiment in this application.

704. The NWDAF network element obtains a current network parameter.

Specifically, for a method in which the NWDAF network element obtains the current network parameter, refer to a method for obtaining training data in step 201, and details are not described herein again.

705. The NWDAF network element updates the policy information.

If determining that the current network parameter cannot satisfy an execution policy corresponding to the dedicated QoS flow, the NWDAF network element determines new policy information based on the current network parameter. For example, the NWDAF network element redetermines, based on the current network parameter, the new policy information in the policy information obtained in step 702. For specific descriptions, refer to descriptions in step 203.

706. The NWDAF network element sends the updated policy information to the PCF network element.

A specific process is similar to step 203, and is not described herein.

707. The NWDAF network element determines an updated execution policy based on the updated policy information.

A specific process is similar to step 205, and is not described herein.

708. The PCF network element sends a response message to an SMF network element.

The response message includes the updated execution policy determined in step 707. After receiving the response message, the SMF network element may send the execution policy to at least one of a UPF network element, an AMF network element, an access network device, and a terminal device, so that a network element receiving the execution policy processes data based on the execution policy.

Figure 8:
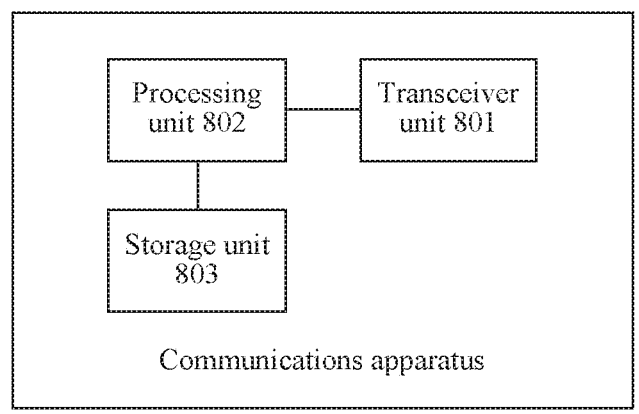
FIG. 8 is a schematic diagram of a communications apparatus according to an embodiment of this application.

FIG. 8 is a schematic diagram of a communications apparatus according to an embodiment of this application. The communications apparatus includes a transceiver unit 801, a processing unit 802, and a storage unit 803. The transceiver unit 801, the processing unit 802, and the storage unit 803 may be physically separated units, or may be integrated into one or more physical units. This is not limited herein.

The transceiver unit 801 is configured to implement content exchange between the processing unit 802 and another unit or network element. Specifically, the transceiver unit 801 may be a communications interface of the communications apparatus, or may be a transceiver circuit or a transceiver, or may be a transceiver machine. In some possible manners, the transceiver unit 801 may alternatively be an antenna device and a circuit matching with the antenna device. The transceiver unit 801 may alternatively be a communications interface or a transceiver circuit of the processing unit 802.

Although FIG. 8 shows only one transceiver unit 801, the communications apparatus may alternatively include a plurality of transceiver units 801, or the transceiver unit 801 includes a plurality of sub transceiver units. The transceiver unit 801 may further include a sending unit and a receiving unit.

The processing unit 802 is configured to implement data processing performed by the communications apparatus. The processing unit 802 may be a processing circuit or may be a processor. The processor may be a central processing unit (CPU), a network processor (NP), or a combination of the CPU and the NP. The processor may further include a hardware chip. The hardware chip may be a specific integrated circuit (ASIC), a programmable logic device (PLD), or a combination thereof. The PLD may be a complex programmable logical device (CPLD), a field-programmable logic gate array (FPGA), a generic array logic (GAL), or a combination thereof.

Although FIG. 8 shows only one processing unit 802, the communications apparatus may further include a plurality of processing units, or the processing unit 802 includes a plurality of sub data processing units. Specifically, the processor may be a single-core (single-CPU) processor, or may be a multi-core (multi-CPU) processor.

The storage unit 803 is configured to store a computer instruction executed by the processing unit 802. The storage unit 803 may be a storage circuit or may be a memory. The memory may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache.

The storage unit 803 may be a unit independent of the processing unit 802, or may be a storage unit in the processing unit 802. This is not limited herein. Although FIG. 8 shows only one storage unit 803, the communications apparatus may further include a plurality of storage units 803, or the storage unit 803 includes a plurality of sub storage units.

In various embodiments of this application, the processing unit 802 may perform content exchange with another network element by using the transceiver unit 801. For example, the processing unit 802 obtains or receives content from the another network element. If the processing unit 802 and the transceiver unit 801 are two physically separated components, the processing unit 802 may perform content exchange with another unit inside the communications apparatus without using the transceiver unit 801.

In a possible implementation, the transceiver unit 801, the processing unit 802, and the storage unit 803 may be connected to each other by using a bus. The bus may be a peripheral component interconnect (PCI) standard bus, an extended industry standard architecture (EISA) bus, or the like. The bus may be classified into an address bus, a data bus, a control bus, and the like.

In this embodiment of this application, the processing unit 802 enables, based on the computer instruction stored in the storage unit 803, the communications apparatus to implement the method in the first embodiment to the sixth embodiment in this application.

Specifically, the communications apparatus may be a policy control network element, such as a PCF network element. The communications apparatus may alternatively be a data analytics network element, such as an NWDAF network element. The communications apparatus may alternatively be a session management network element, such as an SMF network element.

When the communications apparatus is the policy control network element, the transceiver unit 801 is configured to obtain policy information from the data analytics network element. The processing unit 802 is configured to determine an execution policy of a service based on the policy information.

In a possible implementation, the transceiver unit 801 is further configured to receive a service type that is of a to-be-sent service and that is sent from the session management network element. The processing unit 802 is specifically configured to determine an execution policy of a service of the service type based on the policy information.

In a possible implementation, the transceiver unit 801 is further configured to: send the service type to the data analytics network element, and receive policy information, corresponding to the service type, sent from the data analytics network element. The transceiver unit 801 is further configured to obtain at least one of a network parameter of a network in which the service of the service type is located and information that is about a terminal device and that corresponds to the service.

In a possible implementation, the processing unit 802 is specifically configured to: determine, based on at least one of the network parameter and the information about the terminal device, policy information corresponding to the service of the service type in the policy information, and determine the execution policy of the service of the service type based on the policy information corresponding to the service of the service type.

In a possible implementation, the transceiver unit 801 is further configured to send the execution policy to the session management network element.

In a possible implementation, the transceiver unit 801 is further configured to receive updated policy information sent from the data analytics network element; and the processing unit is further configured to determine, based on the updated policy information, an updated execution policy of the service.

In this embodiment, the transceiver unit 801 is further configured to implement content receiving and sending operations between the policy control network element and an external network element in the first embodiment to the sixth embodiment in this application. The processing unit 802 is further configured to implement internal data or signaling processing operations of the policy control network element in the first embodiment to the sixth embodiment in this application. For example, the processing unit 802 is configured to implement operations of determining the execution policy in step 408 in the third embodiment.

In this embodiment, the processing unit 802 enables, based on the computer instruction stored in the storage unit 803, the policy control network element to implement operations performed by the policy control network element in the first embodiment to the sixth embodiment in this application.

Specifically, in a possible implementation, the processing unit 802 obtains the policy information from the data analytics network element by using the transceiver unit 801; and the processing unit 802 determines the execution policy of the service based on the policy information.

In a possible implementation, the processing unit 802 receives the service type that is of the to-be-sent service and that is sent from the session management network element by using the transceiver unit 801; and the processing unit 802 determines the execution policy of the service of the service type based on the policy information.

In a possible implementation, the processing unit 802 sends the service type to the data analytics network element by using the transceiver unit 801, and the processing unit 802 receives, by using the transceiver unit 801, the policy information, corresponding to the service type, sent from the data analytics network element.

In a possible implementation, the processing unit 802 obtains, by using the transceiver unit 801, at least one of the network parameter of the network in which the service of the service type is located and the information that is about the terminal device and that corresponds to the service.

In a possible implementation, the processing unit 802 determines, in the policy information based on the at least one of the network parameter and the information about the terminal device, the policy information corresponding to the service of the service type, and determines the execution policy of the service of the service type based on the policy information corresponding to the service of the service type.

In a possible implementation, the processing unit 802 sends the execution policy to the session management network element by using the transceiver unit 801.

In a possible implementation, the processing unit 802 receives, by using the transceiver unit 801, the updated policy information sent from the data analytics network element; and the processing unit 802 determines, based on the updated policy information, an updated execution policy of the service.

When the communications apparatus is the data analytics network element, the processing unit 802 is configured to obtain policy information. The transceiver unit 801 is configured to send the policy information to the policy control network element.

In a possible implementation, the transceiver unit 801 is configured to receive a service type that is of a to-be-sent service and that is sent from the policy control network element. The processing unit 802 is specifically configured to obtain policy information corresponding to the service type.

In a possible implementation, the transceiver unit 801 is further configured to obtain a network parameter of a network in which a service of the service type is located. Specifically, the transceiver unit 801 is configured to receive a network parameter that is of a network in which the service of the service type is located and that is sent from the policy analytics network element; or the transceiver unit 801 is configured to: receive information that is about a terminal device and that corresponds to the service sent from the policy analytics network element, and obtain, based on the information about the terminal device, a network parameter of a network in which a service of the service type is located.

In a possible implementation, the processing unit 802 is specifically configured to determine, in the policy information based on the network parameter of the network in which the service of the service type is located, policy information corresponding to the service of the service type.

In a possible implementation, the transceiver unit 801 is further configured to obtain an updated network parameter of the network in which the service of the service type is located; the processing unit 802 is further configured to determine, based on the updated network parameter, updated policy information; and the transceiver unit 801 is further configured to send the updated policy information to the policy control network element.

In a possible implementation, the transceiver unit 801 is further configured to obtain training data; and the processing unit 802 is further configured to obtain policy information of at least one service type based on the training data.

In this embodiment, the transceiver unit 801 is further configured to implement content receiving and sending operations between the data analytics network element and an external network element in the first embodiment to the sixth embodiment in this application. The processing unit 802 is further configured to implement internal data or signaling processing operations of the data analytics network element in the first embodiment to the sixth embodiment in this application. For example, the processing unit 802 is configured to implement operations of determining the policy information in step 402 in the third embodiment.

In this embodiment, the processing unit 802 enables, based on the computer instruction stored in the storage unit 803, the data analytics network element to implement operations performed by the data analytics network element in the first embodiment to the sixth embodiment in this application.

Specifically, in a possible implementation, the processing unit 802 obtains the policy information; and the processing unit 802 sends the policy information to the policy control network element by using the transceiver unit 801.

In a possible implementation, the processing unit 802 receives, by using the transceiver unit 801, the service type that is of the to-be-sent service and that is sent from the policy control network element; and the processing unit 802 obtains the policy information corresponding to the service type.

In a possible implementation, the processing unit 802 obtains, by using the transceiver unit 801, the network parameter of the network in which the service of the service type is located.

In a possible implementation, the processing unit 802 receives, by using the transceiver unit 801, the network parameter that is of the network in which the service of the service type is located and that is sent from the policy analytics network element; or the processing unit 802 receives, by using the transceiver unit 801, the information that is about the terminal device and that corresponds to the service sent from the policy analytics network element, and the processing unit 802 obtains, based on the information about the terminal device, the network parameter of the network in which the service of the service type is located.

In a possible implementation, the processing unit 802 determines, in the policy information based on the network parameter of the network in which the service of the service type is located, policy information corresponding to the service of the service type.

In a possible implementation, the processing unit 802 obtains, by using the transceiver unit 801, an updated network parameter of the network in which the service of the service type is located; the processing unit 802 determines, based on the updated network parameter, updated policy information; and the processing unit 802 sends the updated policy information to the policy control network element by using the transceiver unit 801.

When the communications apparatus is the session management network element, the processing unit 802 is configured to establish a default flow, where the default flow is used to: transmit a service, and establish a dedicated flow for the service based on a service type of the service.

In a possible implementation, the transceiver unit 801 is configured to: send the service type of the service to the policy control network element, and receive an execution policy corresponding to the service type sent from the policy control network element. The transceiver unit 801 is further configured to send, to the policy control network element, at least one of a network parameter of a network in which the service of the service type is located and information that is about a terminal device and that corresponds to the service. The transceiver unit 801 is further configured to receive the service type that is of the service and that is sent from a user plane network element.

In this embodiment, the transceiver unit 801 is further configured to implement content receiving and sending operations between the session management network element and an external network element in the first embodiment to the sixth embodiment in this application. The processing unit 802 is further configured to implement internal data or signaling processing operations of the session management network element in the first embodiment to the sixth embodiment in this application. For example, the processing unit 802 is configured to implement establishing the dedicated flow for the service based on the service type of the service.

In this embodiment, the processing unit 802 enables, based on the computer instruction stored in the storage unit 803, the session management network element to implement operations performed by the session management network element in the second embodiment to the sixth embodiment in this application.

Specifically, the processing unit 802 sends, by using the transceiver unit 801, the service type of the service to the policy control network element; and the processing unit 802 receives, by using the transceiver unit 801, the execution policy, corresponding to the service type, sent from the policy control network element. The processing unit 802 sends, by using the transceiver unit 801, at least one of the network parameter of the network in which the service of the service type is located and the information that is about the terminal device and that corresponds to the service to the policy control network element. The processing unit 802 receives, by using the transceiver unit 801, the service type that is of the service and that is sent from the user plane network element.

In the foregoing various possible implementations of the communications apparatus, the policy information includes at least one of the following requirements: a packet loss rate requirement, a latency requirement, a bandwidth requirement, a window size requirement, a radio channel quality requirement, a carrier requirement, and a channel quality indicator CQI filtering coefficient requirement. The execution policy includes at least one of a handover threshold, a guaranteed bit rate GBR, a maximum bit rate MBR, a packet loss rate, a latency, a jitter, a window size, and a CQI filtering coefficient.

In various embodiments of this application, for ease of understanding, a plurality of examples are used for description. However, these examples are merely examples, and do not mean being optimal implementations for implementing this application.

In various embodiments of this application, for ease of descriptions, names of a request message, a response message, and other various messages are used. However, these messages are merely used to describe, by using examples, content needing to be carried or a function needing to be implemented, and specific names of the messages are not intended to limit this application, for example, may be a first message, a second message, or a third message. These messages may be some specific messages, or may be some fields in the messages. These messages may further represent various service operations.

All or some of the foregoing embodiments may be implemented by using software, hardware, firmware, or any combination thereof. When software is used to implement the embodiments, the embodiments may be implemented completely or partially in a form of a computer program product. The computer program product may include one or more computer instructions. When the computer program instructions are loaded and executed on the computer, the procedure or function according to the embodiments of this application are all or partially performed. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic disk), an optical medium (for example, a DVD), a semiconductor medium (for example, a solid-state drive (SSD)), or the like.

A person of ordinary skill in the art may be aware that, with reference to various examples described in the embodiments disclosed in this specification, functions and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, apparatus, and unit, refer to a corresponding process in the foregoing method embodiments, and this is not limited herein.

In some embodiments provided in this application, it should be understood that the disclosed system, apparatus, and method may be implemented in other manners. For example, the described apparatus embodiment is merely an example. For example, the unit division is merely logical function division and may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separated parts for descriptions may or may not be physically separated, and parts displayed as units may or may not be physical units, that is, may be located in one position, or may be distributed on a plurality of network units. Some or all of the units may be selected based on actual requirements to achieve the objectives of the solutions of the embodiments.

In addition, various functional units in various embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in one storage medium, and includes several instructions for enabling a computer device (which may be a personal computer, a server, a network device, or the like) to perform all or some of the steps of the method described in various embodiments of this application. The foregoing storage medium includes: any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A policy determining method, comprising:
obtaining, by a policy control network element, policy information from a data analytics network element;
receiving, by the policy control network element, a service type from a session management network element, the service type being a type of a to-be-sent service;
obtaining, by the policy control network element, at least one of a network parameter of a network in which a service of the service type is located or information that is about a terminal device and that corresponds to the service; and
determining, by the policy control network element, an execution policy of the service of the service type based on the policy information by steps comprising:
determining policy information corresponding to the service of the service type in the policy information based on the at least one of the network parameter of the network in which the service of the service type is located or the information that is about the terminal device and corresponds to the service of the service type, and
determining the execution policy of the service of the service type based on the policy information corresponding to the service of the service type,
wherein the obtaining the policy information from the data analytics network element comprises:
sending the service type to the data analytics network element; and
receiving the policy information from the data analytics network element, wherein the policy information corresponds to the service type.

2. The method according to claim 1, wherein the policy information comprises at least one of: a packet loss rate requirement, a latency requirement, a bandwidth requirement, a window size requirement, a radio channel quality requirement, a carrier requirement, or a channel quality indicator (CQI) filtering coefficient requirement.

3. The method according to claim 1, wherein the execution policy comprises at least one of a handover threshold, a guaranteed bit rate (GBR), a maximum bit rate (MBR), a packet loss rate, a latency, a jitter, a window size, or a CQI filtering coefficient.

4. The method according to claim 1, further comprising:
sending, by the policy control network element, the execution policy to the session management network element.

5. The method according to claim 1, further comprising:
receiving, by the policy control network element, updated policy information from the data analytics network element; and
determining, by the policy control network element based on the updated policy information, an updated execution policy of the service.

6. A communications apparatus comprising at least one processor coupled with a non-transitory computer-readable storage medium storing programming instructions for execution by the at least one processor, wherein the programming instructions instruct the at least one processor to perform operations comprising:
obtaining policy information from a data analytics network element;
receiving a service type from a session management network element, the service type being a type of a to-be-sent service;
obtaining at least one of a network parameter of a network in which a service of the service type is located or information that is about a terminal device and that corresponds to the service; and
determining an execution policy of the service of the service type based on the policy information by steps comprising:
determining the policy information corresponding to the service of the service type in the policy information based on the at least one of the network parameter of the network in which the service of the service type is located or the information that is about the terminal device and corresponds to the service of the service type, and
determining the execution policy of the service of the service type based on the policy information corresponding to the service of the service type,
wherein the obtaining the policy information from the data analytics network element comprises:
sending the service type to the data analytics network element; and
receiving the policy information from the data analytics network element, wherein the policy information corresponds to the service type.

7. The communications apparatus according to claim 6, wherein the policy information comprises at least one of: a packet loss rate requirement, a latency requirement, a bandwidth requirement, a window size requirement, a radio channel quality requirement, a carrier requirement, or a channel quality indicator (CQI) filtering coefficient requirement.

8. The communications apparatus according to claim 6, wherein the execution policy comprises at least one of a handover threshold, a guaranteed bit rate (GBR), a maximum bit rate (MBR), a packet loss rate, a latency, a jitter, a window size, or a CQI filtering coefficient.

9. The communications apparatus according to claim 6, wherein the operations further comprise:
sending the execution policy to the session management network element.

10. The communications apparatus according to claim 6, wherein the operations further comprise:
receiving updated policy information sent from the data analytics network element; and
determining, based on the updated policy information, an updated execution policy of the service.

11. A system comprising:
a policy control apparatus configured to:
obtain policy information from a data analytics network element,
receive a service type from a session management network element, the service type being a type of a to-be-sent service,
obtain at least one of a network parameter of a network in which a service of the service type is located or information that is about a terminal device and that corresponds to the service; and
determine an execution policy of the service of the service type based on the policy information by steps comprising:
determining the policy information corresponding to the service of the service type in the policy information based on the at least one of the network parameter of the network in which the service of the service type is located or the information that is about the terminal device and corresponds to the service of the service type, and
determining the execution policy of the service of the service type based on the policy information corresponding to the service of the service type; and
a data analytics network element configured to send the policy information to the policy control apparatus,
wherein the policy control apparatus is configured to send the service type to the data analytics network element, and the data analytics network element is configured to send the policy information to the policy control apparatus, the policy information corresponding to the service type, and
wherein at least one of the policy control apparatus or the data analytics network element comprises a central processing unit (CPU), a network processor (NP), or a combination of a CPU and an NP.

12. The system according to claim 11, wherein the policy information comprises at least one of: a packet loss rate requirement, a latency requirement, a bandwidth requirement, a window size requirement, a radio channel quality requirement, a carrier requirement, or a channel quality indicator (CQI) filtering coefficient requirement.

13. The system according to claim 11, wherein the execution policy comprises at least one of a handover threshold, a guaranteed bit rate (GBR), a maximum bit rate (MBR), a packet loss rate, a latency, a jitter, a window size, or a CQI filtering coefficient.

14. The system according to claim 11, wherein the policy control apparatus is further configured to:
receive updated policy information sent from the data analytics network element; and
determine, based on the updated policy information, an updated execution policy of the service.

* * * * *